(12) United States Patent
Yoshida et al.

(10) Patent No.: US 11,664,633 B2
(45) Date of Patent: May 30, 2023

(54) POWER WIRING DEVICE

(71) Applicant: ZEON CORPORATION, Tokyo (JP)

(72) Inventors: Masayoshi Yoshida, Tokyo (JP); Kiyoshige Kojima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 22 days.

(21) Appl. No.: 16/766,746

(22) PCT Filed: Nov. 5, 2018

(86) PCT No.: PCT/JP2018/041047
§ 371 (c)(1),
(2) Date: May 26, 2020

(87) PCT Pub. No.: WO2019/111612
PCT Pub. Date: Jun. 13, 2019

(65) Prior Publication Data
US 2020/0328566 A1    Oct. 15, 2020

(30) Foreign Application Priority Data
Dec. 6, 2017    (JP) .............................. JP2017-234574

(51) Int. Cl.
*H01R 25/00*    (2006.01)
*H02S 40/34*    (2014.01)
(Continued)

(52) U.S. Cl.
CPC .......... *H01R 25/003* (2013.01); *H02J 7/0068* (2013.01); *H02S 40/34* (2014.12); *H02S 40/36* (2014.12)

(58) Field of Classification Search
CPC ....... H01R 25/00; H01R 25/003; H02S 40/32; H02S 40/34; H02S 40/36; H02S 40/38;
(Continued)

(56) References Cited

U.S. PATENT DOCUMENTS

| | | |
|---|---|---|
| 5,811,958 A | 9/1998 | Yamamoto |
| 8,108,694 B2 | 1/2012 | Gilbert |

(Continued)

FOREIGN PATENT DOCUMENTS

| | | |
|---|---|---|
| CN | 107078502 A | 8/2017 |
| EP | 2410573 A1 | 1/2012 |

(Continued)

OTHER PUBLICATIONS

Jan. 22, 2019, International Search Report issued in the International Patent Application No. PCT/JP2018/041047.

(Continued)

*Primary Examiner* — Toan T Vu
(74) *Attorney, Agent, or Firm* — Kenja IP Law PC

(57) ABSTRACT

Disclosed is a power wiring device which comprises: at least one elongated wiring member which includes a plurality of first connectors and allows the first connectors to be mutually electrically conducted; and a plurality of circuit modules each including a second connector which is mechanically and electrically attachable to and detachable from any of the first connectors, wherein the plurality of circuit modules include: at least one energy harvesting module as a circuit module capable of outputting power generated by energy harvesting from the second connector; and at least one load module as a circuit module capable of consuming power input from the second connector.

9 Claims, 11 Drawing Sheets

(51) Int. Cl.
 *H02S 40/36* (2014.01)
 *H02J 7/00* (2006.01)
(58) Field of Classification Search
 CPC .. H02J 7/00; H02J 7/025; H02J 7/0068; H02J 7/35
 USPC ............ 307/19, 82, 80, 45, 9.1, 10.1, 66, 64
 See application file for complete search history.

(56) References Cited

U.S. PATENT DOCUMENTS

| | | | |
|---|---|---|---|
| 10,148,088 B2 | 12/2018 | Wendt et al. | |
| 2011/0001485 A1* | 1/2011 | Feight | H02J 1/10 307/43 |
| 2011/0007491 A1* | 1/2011 | Robinson | H02M 3/04 361/810 |
| 2011/0210611 A1* | 9/2011 | Ledenev | H01L 31/02021 307/71 |
| 2012/0160297 A1* | 6/2012 | Yamakawa | H01L 31/02021 361/104 |
| 2016/0185232 A1* | 6/2016 | Suzuki | B60K 6/26 318/34 |
| 2017/0133983 A1 | 5/2017 | Moslehi et al. | |
| 2017/0288409 A1* | 10/2017 | Yoscovich | H02J 3/383 |
| 2017/0336844 A1* | 11/2017 | Koga | H02J 7/00 |
| 2018/0019602 A1* | 1/2018 | Hasan | H02J 7/0029 |
| 2018/0062392 A1* | 3/2018 | Urabe | H02J 3/385 |
| 2018/0297476 A1* | 10/2018 | Malek | H02J 7/0068 |

FOREIGN PATENT DOCUMENTS

| | | |
|---|---|---|
| JP | S5636144 Y2 | 8/1981 |
| JP | H01174955 U | 12/1989 |
| JP | H05230960 A | 9/1993 |
| JP | H11164495 A | 6/1999 |
| JP | 2000207040 A | 7/2000 |
| JP | 2006024777 A | 1/2006 |
| JP | 2006114670 A | 4/2006 |
| JP | 2006280145 A | 10/2006 |
| JP | 2009153417 A | 7/2009 |

OTHER PUBLICATIONS

Jun. 9, 2020, International Preliminary Report on Patentability issued in the International Patent Application No. PCT/JP2018/041047.

Mar. 30, 2021, the Extended European Search Report issued by the European Patent Office in the corresponding European Patent Application No. 18884984.8.

* cited by examiner

POWER WIRING DEVICE

TECHNICAL FIELD

The present disclosure relates to a power wiring device.

BACKGROUND

In recent years, there has been a growing demand for portable energy harvesting apparatuses that generate electric power in accordance with the external environment so that users can use portable electronic devices such as smartphones, notebook personal computers (PCs), tablet PCs, and the like even in outdoor areas where they cannot obtain commercial power supply. Examples of such an energy harvesting apparatus include an apparatus including a solar cell that generates power using light energy such as solar light, and an apparatus including a thermoelectric conversion element that generates power using thermal energy such as geothermal heat.

Examples of such an energy harvesting apparatus include a solar cell module described for example in PTL 1, which can be formed by coupling a plurality of modules.

CITATION LIST

Patent Literature

PTL 1: JPS5636144Y

SUMMARY

Technical Problem

In the meantime, when an energy harvesting apparatus is used to supply power to a load, it is conceivable to construct a power wiring device in which an energy harvesting apparatus (energy harvesting module) is connected to a load (load module) with a certain wiring member. When installing such a power wiring device, it is required to dispose the energy harvesting module in a location that provides good power generation efficiency. However, such a location can change over time due to external factors. For example, when a solar cell is used as an energy harvesting module, sunny locations that provide good power generation efficiency and less sunny locations that provide poor power generation efficiency change over time depending on the external environment such as the time zone and weather. Thus, the power generation efficiency of the power wiring device may be lowered depending on the external environment.

Accordingly, an object of the present disclosure is to provide a power wiring device capable of solving the problems described above to prevent reductions in the power generation efficiency due to the external environment.

Solution to Problem

The present disclosure aims to advantageously solve the above problems, and a disclosed power wiring device comprises: at least one elongated wiring member which includes a plurality of first connectors and allows the first connectors to be mutually electrically conducted; and a plurality of circuit modules each including a second connector which is mechanically and electrically attachable to and detachable from any of the first connectors, wherein the plurality of circuit modules includes: at least one energy harvesting module as a circuit module capable of outputting power generated by energy harvesting from the second connector; and at least one load module as a circuit module capable of consuming power input from the second connector. With such a configuration, the energy harvesting module as a circuit module can be attached to or detached from any of the first connectors of the wiring member. Therefore, by appropriately attaching or detaching the energy harvesting module so as to be disposed in a location that provides good power generation efficiency, it is possible to prevent reductions in power generation efficiency due to the external environment.

In the disclosed power wiring device, it is preferred that the energy harvesting module either includes an energy harvesting power generator capable of generating power by energy harvesting or is connectable to the energy harvesting power generator. With such a configuration, the power wiring device can have an energy harvesting power generator incorporated into the energy harvesting module in advance or can allow a desired energy harvesting power generator to be connected to the energy harvesting module as required.

In the disclosed power wiring device, it is preferred that the energy harvesting module includes a reverse current preventor which prevents a current from the second connector from flowing into the energy harvesting power generator. With such a configuration, even when a power supply from the energy harvesting power generator is lowered, for example, it is possible to prevent a current from other circuit modules flowing into the energy harvesting power generator to cause defects and other unwanted events.

In the disclosed power wiring device, it is preferred that the load module includes a load capable of consuming power or is connectable to the load. With such a configuration, the power wiring device can have a load incorporated into the load module in advance or can allow a desired load to be connected to the load module as required.

In the disclosed power wiring device, it is preferred that the load module includes a voltage controller which controls a voltage input from the second connector to a predetermined level and outputs the voltage to the load. With such a configuration, the load module can output, even when the voltage input from the second connector is not suitable for the load, the voltage to the load after controlling the voltage to a predetermined level suitable for the load.

In the disclosed power wiring device, it is preferred that the at least one energy harvesting module includes a plurality of energy harvesting modules. With such a configuration, it is possible to increase the power that can be output to circuit modules such as a load module.

In the disclosed power wiring device, it is preferred that the at least one load module includes a plurality of load modules. With such a configuration, it is possible to supply power to a plurality of loads at the same time.

In the disclosed power wiring device, it is preferred that each first connector is disposed along an extending direction of the wiring member, the wiring member further includes at one end a third connector and at the other end a fourth connector which is mechanically and electrically attachable to and detachable from the third connector, and the wiring member allows the plurality of first connectors, the third connector and the fourth connector to be mutually electrically conducted. With such a configuration, it is possible to increase the total number of first connectors attachable to and detachable from circuit modules by connecting the third connector of the wiring member to the fourth connector of another wiring member, or by connecting the fourth connector of the wiring member to the third connector of another wiring member.

It is preferred that the disclosed power wiring device further includes a connecting member which includes: a fifth connector which is mechanically and electrically attachable to and detachable from the third connector; a sixth connector mechanically and electrically attachable to and detachable from the fourth connector; and a switcher capable of switching between electrical connection and disconnection between the fifth connector and the sixth connector. With such a configuration, it is possible to switch between electrical connection and disconnection with the wiring member being mechanically connected to another wiring member via the switcher.

In the disclosed power wiring device, it is preferred that the switcher is a switching element.

In the disclosed power wiring device, it is preferred that the at least one wiring member includes a plurality of wiring members, the at least one energy harvesting module and the at least one load module are connected to each wiring member, and at least two of the plurality of wiring members are connected via the connecting member. With such a configuration, it is possible to switch between electrical connection and disconnection between a plurality of wiring members mechanically connected via the switcher. Therefore, according to the generated power of the energy harvesting module, it is possible to preferentially supply power to a load module with higher power supply priority.

It is preferred that the disclosed power wiring device includes a branching member which includes: at least one fifth connector which is mechanically and electrically attachable to and detachable from the third connector; and at least one sixth connector mechanically and electrically attachable to and detachable from the fourth connector, wherein the at least one fifth connector includes a plurality of fifth connectors and/or the at least one sixth connector includes a plurality of sixth connectors. With such a configuration, it is possible to connect three or more wiring members via one branching member and thus to increase the degree of freedom of arrangement.

In the disclosed power wiring device, it is preferred that the plurality of circuit modules includes a secondary battery module which includes a secondary battery and serves as a circuit module capable of switching between a charging state in which power input from the second connector is supplied to the secondary battery, and a power feeding state in which power from the secondary battery is output from the secondary connector. With this configuration, for example, power can be stably supplied to the load module by allowing the secondary battery module to switch between charging state and power feeding state depending on the situation, e.g., switching the secondary battery module to the power feeding state when power supply to the load module is insufficient and switching the secondary battery module to the charging state when the power supply to the load module is sufficient.

Advantageous Effect

According to present disclosure, it is possible to provide a power wiring device capable of preventing reductions in power generation efficiency due to the external environment.

DETAILED DESCRIPTION

Figure 1:
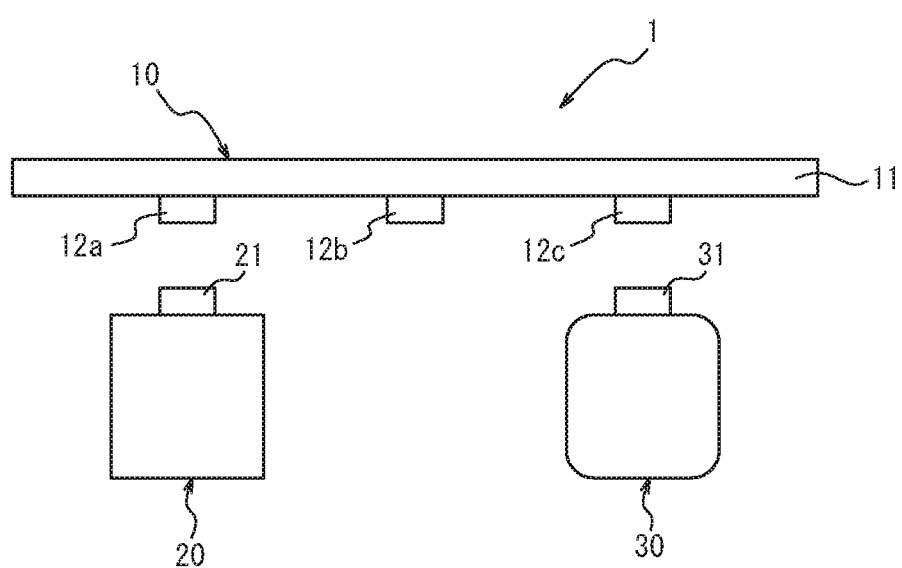
FIG. 1 is a schematic diagram of a power wiring device according to a first embodiment of the present disclosure.

Hereinafter, embodiments of the present disclosure herein will be described with reference to the accompanying drawings. The common components in each figure are denoted by the same reference numerals.

First Embodiment

[Configuration of Power Wiring Device 1]

FIG. 1 is a schematic diagram of a power wiring device 1 according to an embodiment of the present disclosure. As shown in FIG. 1, the power wiring device 1 includes a wiring member 10 and a plurality of circuit modules. The plurality of circuit modules includes at least an energy harvesting module 20 and a load module 30, as shown in FIG. 1. As will be described in detail later, each of the plurality of circuit modules includes a second connector (e.g., a second connector 21 of an energy harvesting module 20 or a second connector 31 of a load module 30) which is mechanically and electrically attachable to or detachable from any of the plurality of first connectors 12a, 12b, 12c of the wiring member 10. The plurality of circuit modules is electrically connected in parallel to each other via the wiring member 10. In FIG. 1, the shape of each component of the power wiring device 1 is defined for convenience of explanation; the shape of each component is not limited to the one shown in FIG. 1. This applies to every drawing described below.

As shown in FIG. 1, the wiring member 10 is an elongated member as a whole, including an elongated conductive part 11 and three first connectors 12a, 12b, 12c. The wiring member 10 may include a sheath part for covering the circumference of the conductive part 11.

The conductive part 11 can conduct electricity along its extending direction, e.g., over the entire length. The conductive part 11 includes an electrical conductor. Examples of electrical conductors included in the conductive part 11 include, but are not limited to, those formed of metal materials selected from the group consisting of copper, aluminum, nickel and iron, and those formed of alloy materials including the foregoing metal materials. The conductive part 11 may have flexibility that allows it to be repeatedly bent at any position along the extending direction or may have rigidity. From the viewpoint of increasing the degree of freedom of installation of the entire power wiring device 1 by making the wiring member 10 deformable, it is preferred that the conductive part 11 has flexibility.

The three first connectors 12a, 12b, 12c are each connected to the conductive part 11. Hence, the three first connector 12a, 12b, 12c are mutually electrically conducted, i.e., mutually electrically connected, via the conductive part 11. In this embodiment, the three first connector 12a, 12b, 12c are disposed along the extending direction of the wiring member 10 so as to be spaced apart from one another.

FIG. 1 shows an example wherein the wiring member 10 includes three first connector 12a, 12b, 12c. However, it is only necessary that the wiring member 10 includes a plurality of first connectors. That is, the wiring member 10 may include two first connectors or four or more first connectors. In that case, the plurality of first connectors are mutually electrically conducted. The plurality of first connectors may be disposed along the extending direction of the wiring member 10 so as to be spaced apart from one another. The plurality of first connectors may be identical in shape, for example. Hereinafter, when any of the three first connectors 12a, 12b, 12c is designated without being distinguished from one another, it may be simply designated as the first connector 12.

As shown in FIG. 1, the energy harvesting module 20 includes a second connector 21. The energy harvesting module 20 can output power, generated by energy harvesting, from the second connector 21. Although FIG. 1 shows only one energy harvesting module 20, the power wiring device 1 may include a plurality of energy harvesting modules 20. When more than one energy harvesting module 20 is provided, each energy harvesting module 20 may have a different power generation capacity.

The second connector 21 is mechanically and electrically attachable to and detachable from any of the first connectors 12 of the wiring member 10. The phrase "mechanically and electrically attachable to and detachable from" as used herein for two connectors means that one of the connectors is attachable to and detachable from the other connector. In a state where one of the connectors is attached to the other connector, the two connectors are mechanically and electrically connected to each other. In a state where one of the connectors is detached from the other connector, the two connectors are not mechanically and electrically connected to each other.

Figure 2A:
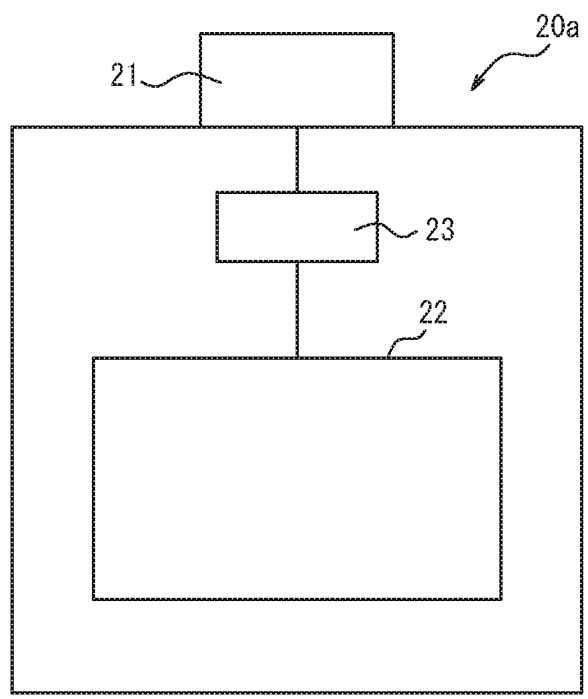
FIG. 2A is a schematic diagram showing a first configuration example of an energy harvesting module as a circuit module of the power wiring device shown in FIG. 1.
Figure 2B:
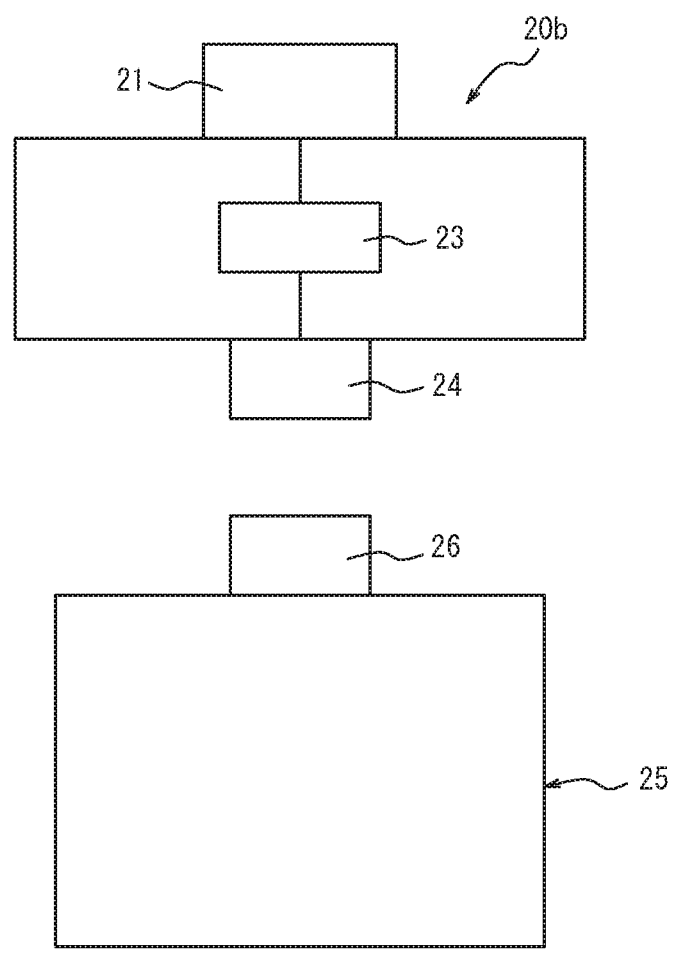
FIG. 2B a schematic diagram showing a second configuration example of an energy harvesting module as a circuit module of the power wiring device shown in FIG. 1.

FIGS. 2A and 2B are schematic diagrams showing a configuration example of the energy harvesting module 20 as a circuit module of the power wiring device 1. Specifically, FIG. 2A is a schematic diagram of an energy harvesting module 20a as a first configuration example of the energy harvesting module 20. FIG. 2B is a schematic diagram of an energy harvesting module 20b as a second configuration example of the energy harvesting module 20.

As shown in FIG. 2A, the energy harvesting module 20a as a first configuration example of the energy harvesting module 20 includes, in addition to the second connector 21 described above, an energy harvesting power generator 22 and a reverse current preventer 23. The second connector 21 and the reverse current preventer 23 are electrically connected to each other via an electrical wiring. The reverse current preventer 23 and the energy harvesting power generator 22 are electrically connected to each other via an electrical wiring. Of note, the electrical connection between the second connector 21 and the reverse current preventer 23, and the electrical connection between the reverse current preventer 23 and the energy harvesting power generator 22 may be respectively established by direct connection without an electrical wiring.

The energy harvesting power generator 22 is capable of generating electric power by energy harvesting. That is, the energy harvesting power generator 22 generates power according to the external environment. Therefore, the power generated by the energy harvesting power generator 22 varies depending on the external environment. The energy harvesting power generator 22 has, for example, a solar cell that generates power using light energy such as solar light or room light. Alternatively, the energy harvesting power generator 22 has, for example, a thermoelectric conversion element that generates power using thermal energy such as geothermal heat to generate electricity. The energy harvesting power generator 22 outputs the generated power to the second connector 21 via the reverse current preventer 23.

The energy harvesting power generator 22 of the present embodiment includes a solar cell panel composed of solar cells. The solar cell panel is a member which includes solar cells that photoelectrically convert incident light such as sunlight and/or room light to output electric power. Types of solar cells constituting the solar cell panel are roughly classified into inorganic solar cells in which an inorganic material is used and organic solar cells in which an organic material is used. Examples of inorganic solar cells include silicon (Si) solar cells in which silicon is used and compound solar cells in which a compound is used. Examples of organic solar cells include thin-film solar cells such as low-molecular weight vapor deposition-type solar cells in which an organic pigment is used, polymer coating-type solar cells in which a conductive polymer is used, and coating-conversion-type solar cells in which a conversion-type semiconductor is used; and dye-sensitized solar cells formed from titania, an organic dye, and an electrolyte. The solar cells constituting the solar panel can also include organic/inorganic hybrid solar cells and solar cells in which a perovskite compound is used. The solar cell panel may be in the form of a thin panel. In this case, a dye-sensitized solar cell manufactured on a plastic film or the like is preferred in that it can be easily shaped to have a thin shape. It is needless to say that the solar cell panel 16 is not limited to the one made on the above-mentioned plastic film or the like and may be of any type as long as it is thin. When the solar cell panel has a thin panel shape, the thickness is preferably 10 μm or more and 3 mm or less from the perspective of manufacturing technique, for example.

The reverse current preventer 23 prevents a current from the second connector 21 from flowing into the energy harvesting power generator 22. The reverse current preventer 23 may include a circuit element such as a diode. When using a diode as the reverse current preventer 23, the diode is connected such that the anode is on the energy harvesting power generator 22 side and the cathode on the second connector 21 side. As the reverse current preventer 23, a transistor in which the collector and base terminals are connected may be used as a diode.

As shown in FIG. 2B, the energy harvesting module 20b as a second configuration example of the energy harvesting module 20 includes, in addition to the second connector 21 described above, a reverse current preventer 23 and a power generator connection connector 24. The energy harvesting module 20b differs from the energy harvesting module 20a in that the former does not include the energy harvesting power generator 22 whereas the latter includes the energy harvesting power generator 22.

The reverse current preventer 23 of the energy harvesting module 20b prevents a current from the second connector 21 from flowing into the power generator connection connector 24. The other configurations are the same as those of the reverse current preventer 23 of the energy harvesting module 20a.

The power generator connection connector 24 is a connector to which an external energy harvesting power generator 25 is mechanically and electrically connectable. The power generator connection connector 24 may be mechanically and electrically attachable to and detachable from the external energy harvesting power generator 25. The power generator connection connector 24 is not particularly limited; a connector satisfying a given standard, e.g., a connector using universal serial bus (USB) interface, can be used.

The external energy harvesting power generator 25 is similar in configuration to the energy harvesting power generator 22 of the energy harvesting modules 20a, except that it includes a connector 26. The connector 26 is a connector which is mechanically and electrically connectable to the power generator connection connector 24. The connector 26 is not particularly limited as in the case of the power generator connection connector 24.

As shown in FIG. 1, the load module 30 includes a second connector 31. The load module 30 is capable of consuming the power input from the second connector 31. The second connector 31 is mechanically and electrically attachable to and detachable from any of the first connectors 12 of the wiring member 10, as with the second connector 21 of the energy harvesting module 20. Although only one load module 30 is shown in FIG. 1, the power wiring device 1 may include a plurality of load modules 30. When more than one load module 30 is provided, each load module 30 may have different power consumption.

Figure 3A:
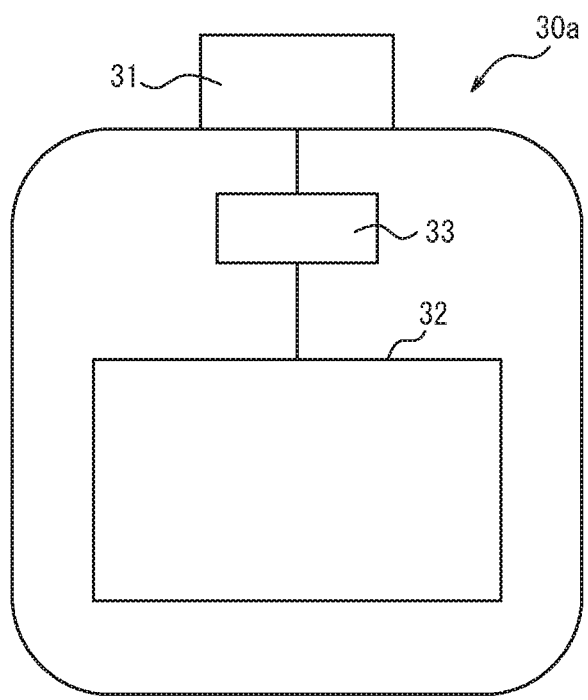
FIG. 3A is a schematic diagram showing a first configuration example of a load module as a circuit module of the power wiring device shown in FIG. 1.
Figure 3B:
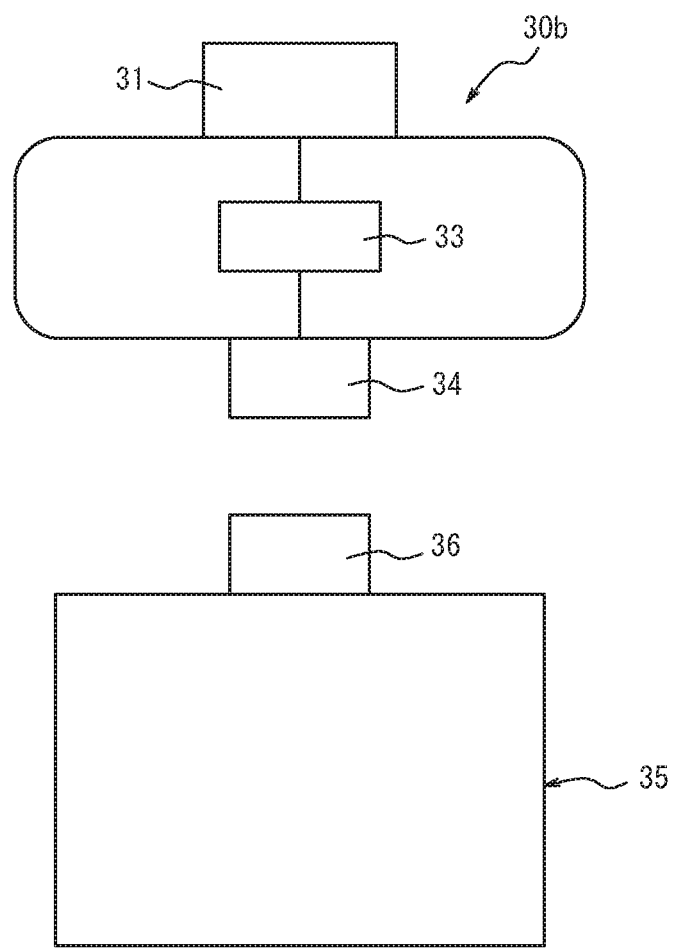
FIG. 3B is a schematic diagram showing a second configuration example of a load module as a circuit module of the power wiring device shown in FIG. 1.

FIGS. 3A and 3B are schematic diagrams showing a configuration example of the load module 30 as a circuit module of the power wiring device 1. Specifically, FIG. 3A is a schematic diagram of a load module 30a as a first configuration example of the load module 30. FIG. 3B is a schematic diagram of a load module 30b as a second configuration example of the load module 30.

As shown in FIG. 3A, the load module 30a as a first configuration example of the load module 30 includes a load 32 and a voltage controller 33 in addition to the second connector 31 described above. The second connector 31 and the voltage controller 33 are electrically connected to each other via an electrical wiring. The voltage controller 33 and the load 32 are electrically connected to each other via an electrical wiring. Of note, the electrical connection between the second connector 31 and the voltage controller 33, and the electrical connection between the voltage controller 33 and the load 32 may be respectively established by direct connection without an electrical wiring.

The load 32 may be any load capable of consuming power. The load 32 may be, for example, an electronic device such as a radio, an LED illumination device, or the like. The power consumed by the load 32 may vary depending on, for example, the driving state of the load 32.

The voltage controller 33 controls the power input from the second connector 31 to have a predetermined voltage level and outputs it to the load 32. Specifically, the voltage controller 33 lowers or boosts the power input from the second connector 31 to a predetermined voltage level suitable for driving the load 32 e.g., rated voltage of the load 32, and outputs it to the load 32.

As shown in FIG. 3B, the load module 30b as a second configuration example of the load module 30 includes a voltage controller 33 and a load connection connector 34 in addition to the second connector 31 described above.

The voltage controller 33 of the load module 30b controls the power input from the second connector 31 to a predetermined voltage level and outputs it to the load connection connector 34. Specifically, the voltage controller 33 lowers or boosts the power input from the second connector 31 to a predetermined voltage level satisfying the standard of the load connection connector 34, e.g., rated voltage, and outputs it to the load connection connector 34.

The load connection connector 34 is a connector to which an external load 35 is mechanically and electrically connectable. The load connection connector 34 may be mechanically and electrically attachable to and detachable from the external load 35. The load connection connector 34 is not particularly limited; a connector satisfying a given standard, e.g., a connector using USB interface, can be used.

The external load 35 is similar in configuration to the load 32 of the load modules 30a, except that it includes a connector 36. The connector 36 is a connector which is mechanically and electrically connectable to the load connection connector 34. The connector 36, as in the case of the load connection connector 34, is not particularly limited; a connector satisfying a given standard, e.g., a connector using USB interface, can be used. It is only necessary that the external load 35 is such a load which is connectable to the load connection connector 34 via the connector 36. For example, the external load 35 may be a common electronic device such as, for example, a smartphone, a cellular phone or a personal computer.

Figure 4:
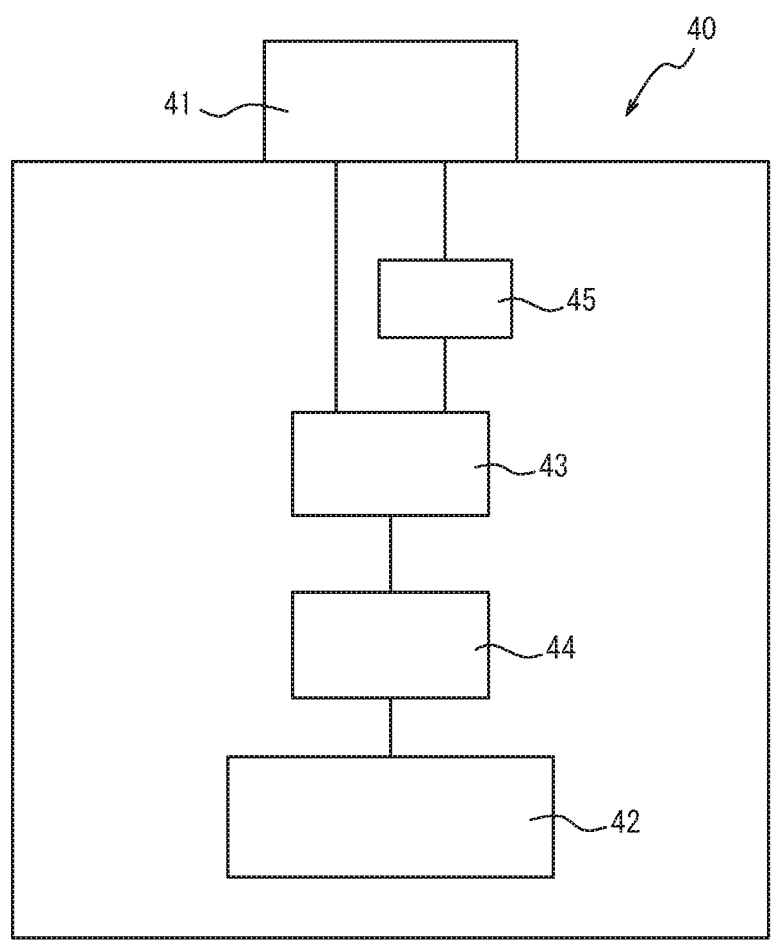
FIG. 4 is a schematic diagram showing a configuration example of a secondary battery module as a circuit module of the power wiring device shown in FIG. 1.

The power wiring device 1 may further include a secondary battery module as a circuit module. FIG. 4 is a schematic diagram illustrating a secondary battery module 40 as an exemplary configuration of a secondary battery module as a circuit module of the power wiring device 1.

As shown in FIG. 4, the secondary battery module 40 includes a second connector 41. The second connector 41 is mechanically and electrically attachable to and detachable from any of the first connectors 12 of the wiring member 10, as with the second connector 21 of the energy harvesting module 20 and the second connector 31 of the load module 30 shown in FIG. 1 and other drawings. The power wiring device 1 may include a plurality of secondary battery modules 40. When more than one secondary battery module 40 is provided, each secondary battery module 40 may have a different input power during charging and a different output power during power feeding.

As shown in FIG. 4, the secondary battery module 40 includes, in addition to the second connector 41 described above, a secondary battery 42, a switcher 43, a voltage controller 44, and a reverse current preventer 45.

The secondary battery 42 is a chargeable/dischargeable secondary battery. The secondary battery 42 may be, for example, a lithium-ion battery, a nickel-metal hydride battery, or the like.

The switcher 43 can switch between a charging state in which the power input from the second connector 41 is supplied to the secondary battery 42, and a power feeding state in which the power from the secondary battery 42 is output from the second connector 41. The switcher 43 includes, for example, a switching element between the second connector 41 and the secondary battery 42. The switching element is electrically connected to the second connector 41 and the secondary battery 42.

The voltage controller 44 controls the power input from the second connector 41 to a predetermined voltage level and outputs it the secondary battery 42. Specifically, the voltage controller 44 lowers or boosts the power input from the second connector 41 to a predetermined voltage level suitable for charging the secondary battery 42, e.g., rated voltage of the secondary battery 42, and outputs it to the secondary battery 42. Further, the voltage controller 44 controls the power input from the secondary battery 42 to a predetermined voltage level and outputs it to the second connector 41. Specifically, the voltage controller 44 lowers or boosts the power input from the secondary battery 42 to a predetermined voltage level suitable for other circuit modules such as the load module 30, and outputs it to the second connector 41. Between the switcher 43 and the secondary battery 42, the voltage controller 44 is electrically connected to the switcher 43 and the secondary battery 42.

The reverse current preventer 45 prevents a current from the second connector 41 from flowing into the secondary battery 42 when the switcher 43 is in the power feeding state. The reverse current preventer 45 may include a circuit element such as a diode. When using a diode as the reverse current preventer 45, the diode is connected such that the anode is on the secondary battery 42 side and the cathode on the second connector 41 side. The reverse current preventer 45 is positioned on a wiring where energizing occurs when the switcher 43 is in the power feeding state and no energizing occurs when the switcher is in the charging state.

With the power wiring device 1 including the secondary battery module 40 as described above, it is possible to stably supply power to the load module 30 by allowing the secondary battery module 40 to switch between the charging state and power feeding state depending on the situation— e.g., the secondary battery module 40 is switched to the power feeding state when power supply to the load module 30 is insufficient and the secondary battery module 40 is switched to the charging state when power supply to the load module 30 is sufficient.

[First Use State]

Figure 5:
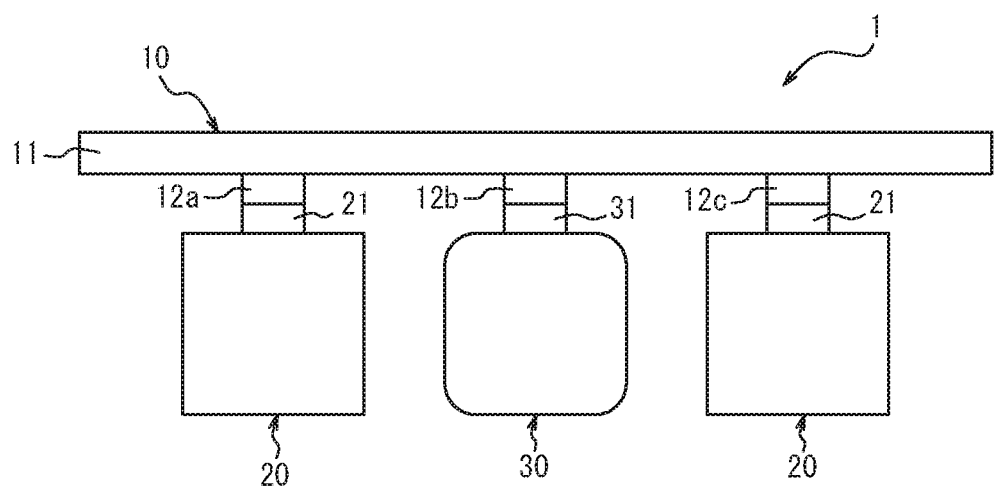
FIG. 5 is a diagram showing a first use state of the power wiring device shown in FIG. 1.

FIG. 5 is a diagram showing a first use state of the power wiring device 1. As shown in FIG. 5, in the power wiring device 1 in the present use state, two energy harvesting modules 20 and one load module 30 are connected to one wiring member 10. In the example shown in FIG. 5, two energy harvesting modules 20 are connected one by one to the first connectors 12a, 12c of the wiring member 10. One load module 30 is connected to the first connector 12b of the wiring member 10.

By providing a plurality of energy harvesting modules 20 for one load module 30 as in the present use state, even when power that is necessary for the load module 30 cannot be supplied with one energy harvesting module 30, it is possible to supply necessary power to the load module 30.

[Second Use State]

Figure 6:
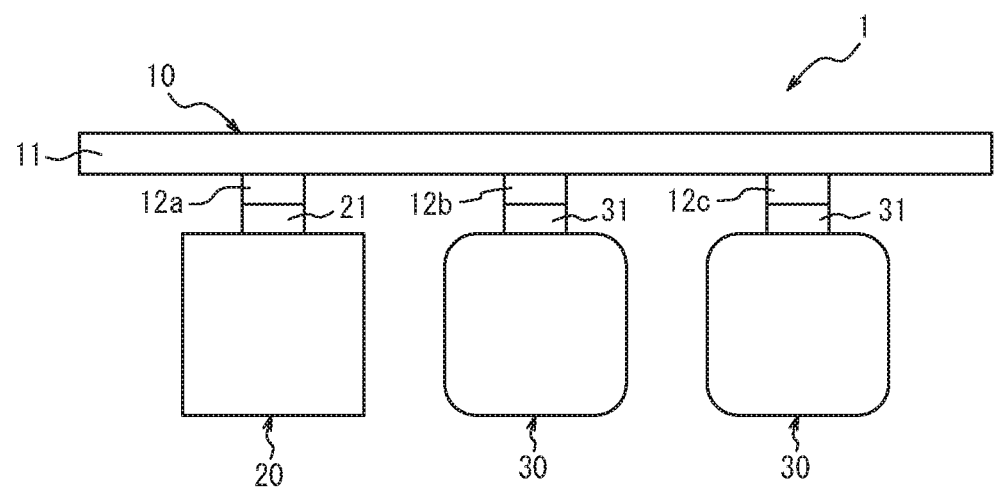
FIG. 6 is a diagram showing a second use state of the power wiring device shown in FIG. 1.

FIG. 6 is a diagram showing a second use state of the power wiring device 1. As shown in FIG. 6, in the power wiring device 1 in the present use state, one energy harvesting module 20 and two load modules 30 are connected to one wiring member 10. In the example shown in FIG. 6, one energy harvesting module 20 is connected to the first connector 12a of the wiring member 10, and two load modules 30 are connected one by one to the first connectors 12b, 12c of the wiring member 10.

By providing a plurality of load modules 30 for one energy harvesting module 20 as in the present use state, when the generated power of the energy harvesting module 20 is sufficient, it is possible to supply power to the plurality of load modules 30 at the same time. Of note, even when the voltages required for the operations of respective loads 32 of the plurality of load modules 30 or respective external loads 35 to which the plurality of load modules 30 are connected are different, the plurality of load modules 30 can be operated by the common energy harvesting module 20 because the voltages are appropriately controlled by the respective voltage controllers 33 of the plurality of load modules 30.

The user can attach or detach a circuit module to or from any desired first connector 12 of the wiring member 10 in a free arrangement according to any use state, including the first and second use states described above. Thus, it is possible to freely configure an arrangement suitable for the use state. Hence, by appropriately attaching or detaching the energy harvesting module 20 so as to be disposed in a location that and provides good power generation efficiency, it is possible to prevent reductions in power generation efficiency due to the external environment. The load module 30 can also be appropriately attached or detached so as to be disposed in a location suitable for use of the load module 30.

Second Embodiment

Figure 7:
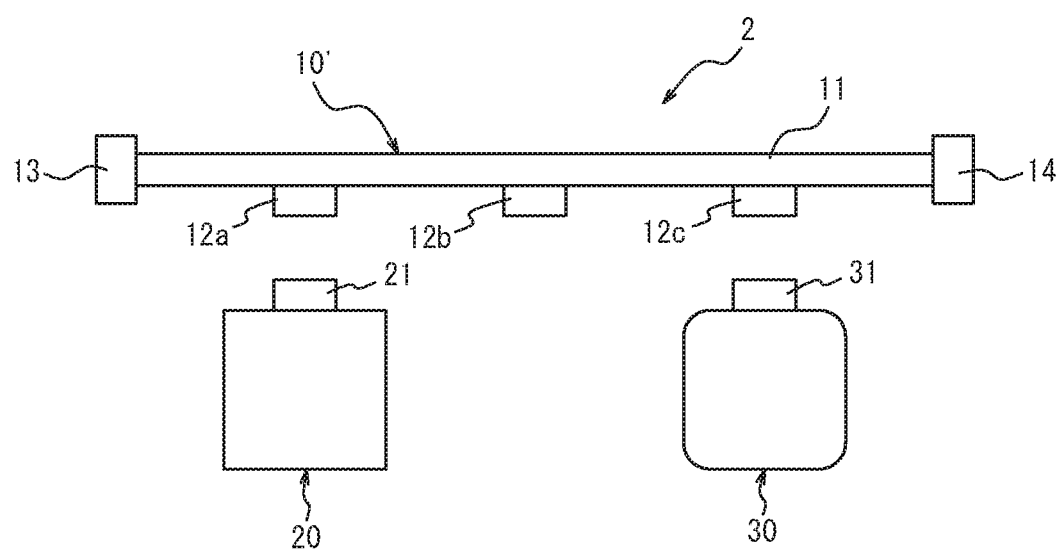
FIG. 7 is a schematic diagram of a power wiring device according to a second embodiment of the present disclosure.

FIG. 7 is a schematic diagram of a power wiring device 2 according to a second embodiment of the present disclosure. As shown in FIG. 7, the power wiring device 2 includes a wiring member 10' and a plurality of circuit modules. The plurality of circuit modules includes at least an energy harvesting module 20 and a load module 30, as shown in FIG. 7. The power wiring device 2 may include a plurality of wiring members 10'. The plurality of circuit modules of the power wiring device 2 of the present embodiment will not be explained below because they are identical to those of the power wiring device 1 of the first embodiment described above.

As shown in FIG. 7, the wiring member 10' of the present embodiment is an elongated member as a whole, including an elongated conductive part 11 and three first connectors 12a, 12b, 12c, as with the wiring member 10 of the first embodiment. The wiring member 10' may include a sheath portion for covering the circumference of the conductive part 11. The conducting part 11 and three first connectors 12a, 12b, 12c in the present embodiment are identical to the corresponding components of the first embodiment. Further, the wiring member 10' does not necessarily have to include three first connectors 12a, 12b, 12c; it is only necessary that the wiring member 10' includes a plurality of first connectors as with the wiring member 10 of the first embodiment.

The wiring member 10' further includes, in addition to the above components, a third connector 13 and a fourth connector 14. The third connector 13 is provided at one end (left end in FIG. 7) of the wiring member 10'. The fourth connector 14 is provided at the other end (right end in FIG. 7) of the wiring member 10'. The fourth connector 14 is mechanically and electrically attachable to or detachable from the third connector 13. The wiring member 10' allows all of the first connectors 12, the third connector 13 and the fourth connector 14 to be electrically connected to one another.

[First State of Use]

Figure 8:
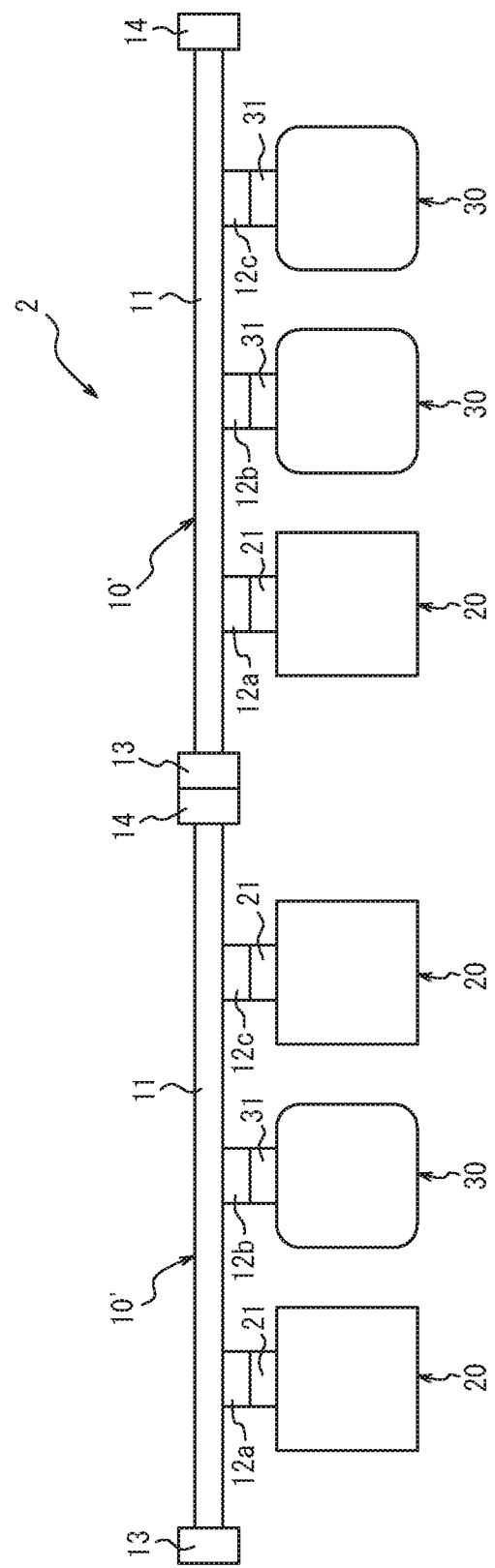
FIG. 8 is a diagram showing a first use state of the power wiring device shown in FIG. 7.

FIG. 8 is a diagram showing a first use state of the power wiring device 2. As shown in FIG. 8, the power wiring device 2 in the present use state includes two wiring members 10'. Two energy harvesting modules 20 and one load module 30 are connected to one of the wiring members 10' (left side in FIG. 8), and one energy harvesting module 20 and two load modules 30 are connected to the other wiring member 10' (right side in FIG. 8). In the example shown in FIG. 8, two energy harvesting modules 20 are connected one by one to the first connectors 12a, 12c of one of the wiring members 10' and one load module 30 is connected to the first connector 12b. One energy harvesting module 20 is connected to the first connector 12a of the other wiring member 10' and two load modules 30 are connected one by one to the first connectors 12b, 12c. The fourth connector 14 of one of the wiring member 10' and the third connector 13 of the other wiring member 10' are mechanically and electrically connected to each other.

By connecting together respective ends of two wiring members 10' as in the present use state, it is possible to obtain a wiring member which is longer than a single wiring member 10' and also to increase the total number of first connectors 12 which are connectable to circuit modules. Therefore, it is possible to increase the degree of freedom of arrangement.

[Second Use State]

Figure 9:
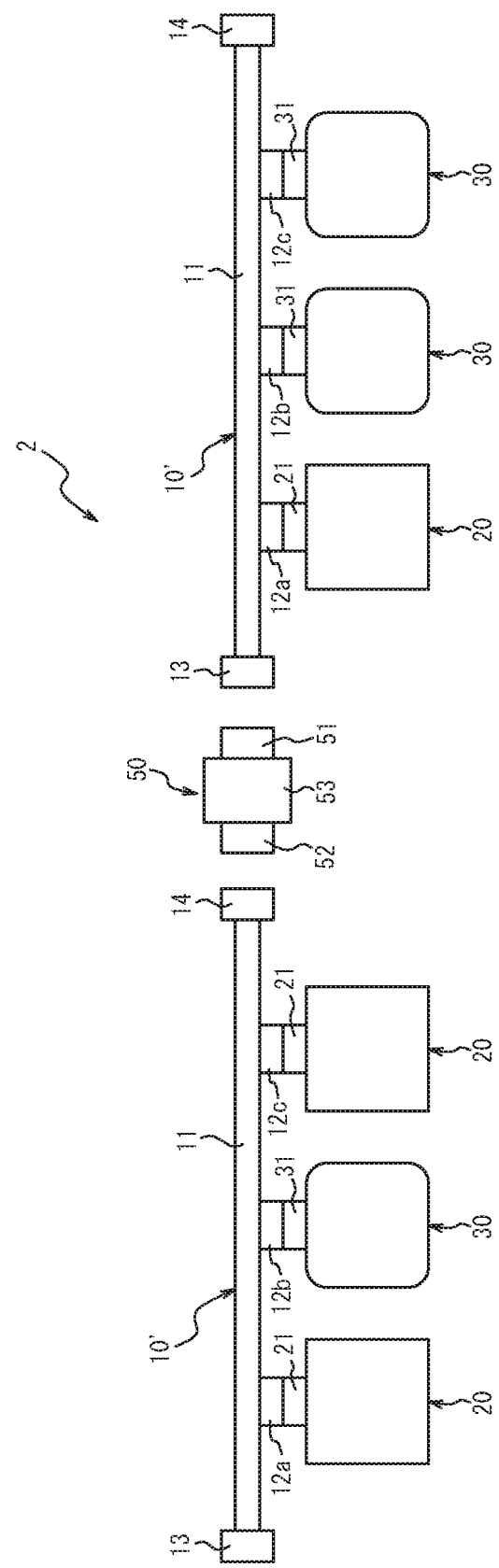
FIG. 9 is a diagram showing a second use state of the power wiring device shown in FIG. 7.

FIG. 9 is a diagram showing a second use state of the power wiring device 2. As shown in FIG. 9, the power wiring device 2 may further include a connecting member 50.

The connecting member 50 includes a fifth connector 51, a sixth connector 52, and a switcher 53. The fifth connector 51 is a connector which is mechanically and electrically attachable to or detachable from the third connector 13 of the wiring member 10'. The sixth connector 52 is a connector which is mechanically and electrically attachable to and detachable from the fourth connector 14 of the wiring member 10'. The switcher 53 allows switching between electrical connection and disconnection between the fifth connector 51 and the sixth connector 52. The switcher 53, for example, includes a switching element between the fifth connector 51 and the sixth connector 52. The switching element is electrically connected to the fifth connector 51 and the sixth connector 52. Of note, the switcher 53 may keep electrical connection between the fifth connector 51 and the sixth connector 52 for example for signal transmission by AC power, while allowing switching between electrical connection and disconnection for example for power supply by DC power.

As shown in FIG. 9, the power wiring device 2 in the present use state includes two wiring members 10'. Two energy harvesting module 20 and one load module 30 are connected to one of the wiring members 10' (left side in FIG. 9). One energy harvesting module 20 and two load modules 30 are connected to the other wiring member 10' (right side in FIG. 9). In the example shown in FIG. 9, two energy harvesting modules 20 are connected one by one to the first connectors 12a, 12c of one of the wiring members 10', and one load module 30 is connected to the first connector 12b. One energy harvesting module 20 is connected to the first connector 12a of the other wiring member 10', and two load modules 30 are connected one by one to the first connectors 12b, 12c. The fourth connector 14 of one of the wiring members 10' and the sixth connector 52 of the connecting member 50 are mechanically and electrically connected to each other. The third connector 13 of the other wiring member 10' and the fifth connector 51 of the connecting member 50 are mechanically and electrically connected to each other. In FIG. 9, for convenience of explanation, the two wiring members 10' are shown spaced apart from the connecting member 50.

By mechanically connecting, among a plurality of wiring members 10' to which at least one energy harvesting module 20 and at least one load module 30 are connected, at least two of the plurality of wiring members 10' via the connecting member 50 as in the present use state, it is possible to switch between electrical connection and disconnection between the plurality of wiring members 10' by switching of the switcher 53 of the connecting member 50. Therefore, in a case where it is desired to preferentially supply power to the load module 30 connected to one of the wiring members 10', when the supply power of the energy harvesting module 20 connected to one of the wiring members 10' is sufficient, the switcher 53 is switched to disconnection so that power is supplied to the load module 30 connected to the one of the wiring members 10', and when the supply power of the energy harvesting module 20 connected to one of the wiring members 10' is not sufficient, the switcher 53 is switched to connection so that the power from the energy harvesting module 20 connected to the other wiring member 10' can be supplied to the load module 30 connected to one of the wiring members 10'. Thus, in accordance with the generated power of the energy harvesting module 20, it is possible to preferentially supply power to a load module 30 of high power supply priority. By switching the switcher 53 to disconnection, it is possible to arrange the energy harvesting module 20 and the load module 30 for each wiring member 10', so that an arbitrary number of energy harvesting modules 20 and an arbitrary number of load modules 30 can be used as one combination to configure a plurality of independent systems.

[Third Use State]

Figure 10:
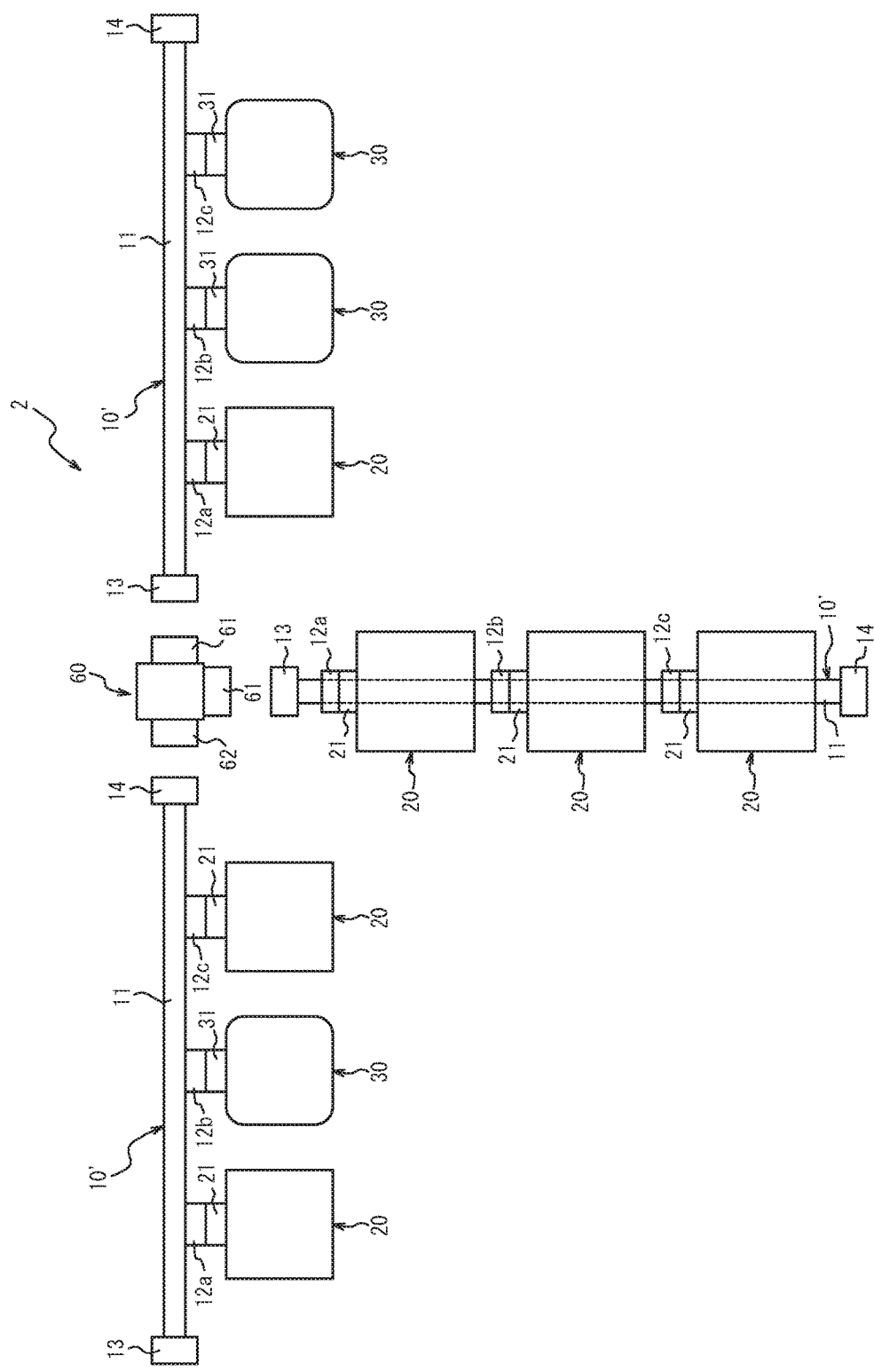
FIG. 10 is a diagram showing a third use state of the power wiring device shown in FIG. 7.

FIG. 10 is a diagram showing a third use state of the power wiring device 2. As shown in FIG. 10, the power wiring device 2 may further include a branching member 60.

The branching member 60 includes two fifth connectors 61 and one sixth connector 62. The fifth connector 61 is a connector which is mechanically and electrically attachable to and detachable from the third connector 13 of the wiring member 10'. The sixth connector 62 is a connector which is mechanically and electrically attachable to and detachable from the fourth connector 14 of the wiring member 10'. All the connectors of the branching member 60, i.e., two fifth connectors 61 and one sixth connector, are electrically connected to one another.

As shown in FIG. 10, the power wiring device 2 in the present use state includes three wiring members 10', where two energy harvesting modules 20 and one load module 30 are connected to the first wiring member 10' (left side in FIG. 10). One energy harvesting module 20 and two load modules 30 are connected to the second wiring member 10' (right side in FIG. 10). Three energy harvesting modules 20 are connected to the third wiring member 10' (lower side in FIG. 10). In the example shown in FIG. 10, two energy harvesting modules 20 are connected one by one to the first connectors 12a, 12c of the first wiring member 10', and one load module 30 is connected to the first connector 12b. One energy harvesting module 20 is connected to the first connector 12a of the second wiring member 10', and two load modules 30 are connected one by one to the first connectors 12b, 12c. Three energy harvesting modules 20 are connected one by one to the first connectors 12a, 12b, 12c of the third wiring member 10'. The fourth connector 14 of the first wiring member 10' and the sixth connector 62 of the branching member 60 are mechanically and electrically connected to each other. The third connector 13 of the second wiring member 10' and one of the fifth connectors 61 of the branching member 60 (right side in FIG. 10) are mechanically and electrically connected to each other. The third connector 13 of the third wiring member 10' and the other fifth connector 61 of the branching member 60 (lower in FIG. 10) are mechanically and electrically connected to each other. In FIG. 10, for convenience of explanation, the three wiring members 10' are shown spaced apart from the branching member 60.

As in this use state, it is possible to mechanically and electrically connect three wiring members 10' via one branching member 60. Thus, it is possible to further increase the degree of freedom of arrangement.

The foregoing description merely illustrates one embodiment of this disclosure and it goes without saying that various modifications and alterations may be made in the claims.

For example, it is only necessary that the connectors described above may be a combination of connectors which are attachable to and detachable from each other, e.g., one of the connectors is a male connector while the other is a female connector. When the first connector 12 is a male connector, the second connector which is attachable to and detachable from the first connector 12 (e.g., second connector 21, 31, 41) is a female connector. On the other hand, when the first connector 12 is a female connector, the second connector which is attachable to and detachable from the first connector 12 is a male connector. When the third connector 13 is a male connector, the fourth connector 14 and the fifth connector 51 which are attachable to and detachable from the third connector 13 are female connectors, and the sixth connector 52 which is attachable to and detachable from the fourth connector 14 is a male connector. On the other hand, when the third connector 13 is a female connector, the fourth connector 14 and the fifth connector 51 which are attachable to and detachable from the third connector 13 are male connectors, and the sixth connector 52 which is attachable to and detachable from the fourth connector 14 is a female connector.

Further, the energy harvesting module 20 may not include the reverse current preventer 23. However, when the energy harvesting module 20 includes the reverse current preventer 23, it is possible to advantageously prevent a current from other circuit modules such as energy harvesting modules 20 from flowing into the energy harvesting power generator 22 or external energy harvesting power generator 25. The energy harvesting module 20 may also include a voltage controller for controlling the output voltage to be constant.

The load module 30 may not include the voltage controller 33. However, when the load module 30 includes the voltage controller 33, it is possible to advantageously prevent a power from a circuit module such as an energy harvesting module 20 from being input into the load 32 or external load 35 at a level exceeding the rated voltage.

The secondary battery module 40 may not include the voltage controller 44. However, when the secondary battery module 40 includes the voltage controller 44, it is possible to advantageously control the voltage of the power input and output from secondary battery 42.

The secondary battery module 40 may not include the reverse current preventer 45. However, when the secondary battery module 40 includes the reverse current preventer 45, it is possible to advantageously prevent, when the switcher 43 is in the power feeding state, a current from other circuit modules such as energy harvesting modules 20 from flowing into the secondary battery 42.

The branching member 60 has been described above as including two fifth connectors 61 and one sixth connector 62. However, the configuration of the branching member 60 is not limited to such a configuration; it is only necessary that the branching member includes a plurality of connectors for at least one of the fifth connector 61 and the sixth connector 62.

INDUSTRIAL APPLICABILITY

According to the present disclosure, it is possible to provide a power wiring device capable of preventing reductions in power generation efficiency due to the external environment.

REFERENCE SIGNS LIST 1, 2 Power wiring device
10, 10' Wiring member
11 Conductive part
12a, 12b, 12c First connector
13 Third connector
14 Fourth connector
20, 20a, 20b Energy harvesting module
21 Second connector
22 Energy harvesting power generator
23 Reverse current preventer
24 Power generator connection connector
25 External energy harvesting power generator
26 Connector
30, 30a, 30b Load module
31 Second connector
32 Load
33 Voltage controller
34 Load connection connector
35 External load
36 Connector
40 Secondary battery module
41 Second connector
42 Secondary battery
43 Switcher
44 Voltage controller
45 Reverse current preventer
50 Connecting member
51 Fifth connector
52 Sixth connector
53 Switcher
60 Branching member
61 Fifth connector
62 Sixth connector

The invention claimed is:

1. A power wiring device comprising:
at least one elongated wiring member which includes a plurality of first connectors and allows the first connectors to be mutually electrically conducted; and
a plurality of circuit modules each including a second connector which is mechanically and electrically attachable to and detachable from any of the first connectors,
wherein the plurality of circuit modules includes:
at least two energy harvesting modules as circuit modules capable of outputting power generated by energy harvesting from each second connector; and
at least one load module as a circuit module capable of consuming power input from each second connector, wherein each of the at least two energy harvesting modules either includes an energy harvesting power generator capable of generating power by energy harvesting or is connectable to the energy harvesting power generator, wherein each of the at least two energy harvesting modules includes a reverse current preventor which prevents a current from each second connector from flowing into the energy harvesting power generator, wherein the plurality of first connectors is identical in shape, wherein each second connector of the at least two energy harvesting modules and each second connector of the at least one load module are identical in shape, wherein the plurality of first connectors are disposed along an extending direction of the wiring member, the wiring member further includes at one end a third connector and at the other end a fourth connector which is mechanically and electrically attachable to and detachable from the third connector, and the wiring member allows the plurality of first connectors, the third connector and the fourth connector to be mutually electrically conducted.

2. The power wiring device of claim 1, wherein the load module includes a load capable of consuming power or is connectable to the load.

3. The power wiring device of claim 2, wherein the load module includes a voltage controller which controls a voltage input from one of the second connectors to a predetermined level and outputs the voltage to the load.

4. The power wiring device of claim 1, wherein the at least one load module includes a plurality of load modules.

5. The power wiring device of claim 1, further comprising a connecting member which includes: a fifth connector which is mechanically and electrically attachable to and detachable from the third connector; a sixth connector mechanically and electrically attachable to and detachable from the fourth connector; and a switcher capable of switching between electrical connection and disconnection between the fifth connector and the sixth connector.

6. The power wiring device of claim 5, wherein the switcher is a switching element.

7. The power wiring device of claim 5, comprising a plurality of the wiring members, wherein
the at least two energy harvesting modules and the at least one load module are connected to each of the wiring members, and
at least two of the wiring members are connected via the connecting member.

8. The power wiring device of claim 1, further comprising branching member which includes: at least one fifth connector which is mechanically and electrically attachable to and detachable from the third connector; and at least one sixth connector mechanically and electrically attachable to and detachable from the fourth connector, wherein the at least one fifth connector includes a plurality of fifth connectors and/or the at least one sixth connector includes a plurality of sixth connectors.

9. The power wiring device of claim 1, wherein the plurality of circuit modules include a secondary battery module which includes a secondary battery and serves as a circuit module capable of switching between a charging state in which power input from one of the second connectors is supplied to the secondary battery, and a feeding state in which power from the secondary battery is output from one of the second connectors.

* * * * *